United States Patent
Kim (10) Patent No.: US 11,235,756 B2
(45) Date of Patent: Feb. 1, 2022

(54) VEHICLE CONTROL METHOD AND SYSTEM BASED ON DETECTION OF FALLING OF LOAD

(71) Applicants: HYUNDAI MOTOR COMPANY, Seoul (KR); KIA MOTORS CORPORATION, Seoul (KR)

(72) Inventor: Dong Hyuk Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 251 days.

(21) Appl. No.: 16/423,494

(22) Filed: May 28, 2019

(65) Prior Publication Data
US 2020/0180608 A1 Jun. 11, 2020

(30) Foreign Application Priority Data

Dec. 7, 2018 (KR) .................. 10-2018-0157459

(51) Int. Cl.
- *B60W 30/09* (2012.01)
- *B60W 40/105* (2012.01)
- *B60W 30/16* (2020.01)

(52) U.S. Cl.
CPC ............ *B60W 30/09* (2013.01); *B60W 30/16* (2013.01); *B60W 40/105* (2013.01); *B60W 2420/42* (2013.01)

(58) Field of Classification Search
CPC .................................................... B60W 30/09
See application file for complete search history.

(56) References Cited

U.S. PATENT DOCUMENTS

| | | | |
|---|---|---|---|
| 10,144,419 B2* | 12/2018 | Viehmann | B62D 9/005 |
| 10,185,327 B1* | 1/2019 | Konrardy | G01C 21/3453 |
| 10,460,182 B1* | 10/2019 | Park | G05D 1/0257 |
| 2017/0184034 A1* | 6/2017 | Chai | B60K 28/00 |
| 2017/0364926 A1* | 12/2017 | Crawford | G06Q 30/018 |
| 2018/0088574 A1* | 3/2018 | Latotzki | G05D 1/0251 |
| 2018/0170396 A1* | 6/2018 | Burnette | B60W 10/184 |
| 2019/0196480 A1* | 6/2019 | Taylor | G05D 1/0088 |
| 2020/0125865 A1* | 4/2020 | Takahama | B60W 30/09 |
| 2020/0385142 A1* | 12/2020 | Gu | G06K 9/32 |

FOREIGN PATENT DOCUMENTS

KR 20180022405 A 3/2018

* cited by examiner

*Primary Examiner* — Alex C Dunn
(74) *Attorney, Agent, or Firm* — Slater Matsil, LLP (57) ABSTRACT

A vehicle control method based on detection of falling of a load includes determining whether a load falls by a vehicle, storing one or more surrounding images in response to the falling of the load, transmitting the one or more surrounding images to a center by the vehicle, determining whether the load falls based on the one or more surrounding images by the center, transmitting vehicle control information based on the determination of whether the load falls by the center, and controlling the vehicle based on the vehicle control information received from the center.

20 Claims, 5 Drawing Sheets

VEHICLE CONTROL METHOD AND SYSTEM BASED ON DETECTION OF FALLING OF LOAD

This application claims the benefit of Korean Patent Application No. 10-2018-0157459, filed on Dec. 7, 2018, which is hereby incorporated by reference as if fully set forth herein.

BACKGROUND

Field

The present disclosure relates to a vehicle control method and system based on detection of falling of a load.

Discussion of the Related Art

In general, an autonomous vehicle is a vehicle that autonomously recognizes a driving environment and drives to a destination without manipulation on the part of a driver.

A general autonomous vehicle recognizes the surroundings of the vehicle using various sensors installed in the vehicle, sets a path based on recognized data, and then drives along the corresponding path. In addition, the vehicle receives information on a driving road or the like through an external relay positioned along a driving path of the vehicle and drives based on the received information.

SUMMARY

An aspect of the present invention provides a vehicle control method and system based on detection of falling of a load.

In more detail, another aspect of the present invention provides a vehicle control method of determining falling of a load based on information of a surrounding object of a vehicle, transmitting information corresponding to the falling of the load to a center, and receiving control information on the falling of the load from the center to control the vehicle.

Additional advantages, aspects, and features of the invention will be set forth in part in the description which follows and in part will become apparent to those having ordinary skill in the art upon examination of the following or may be learned from practice of the invention. The features and other advantages of the invention may be realized and attained by the structure particularly pointed out in the written description and claims hereof as well as the appended drawings.

In one aspect of the invention, a vehicle control method based on detection of falling of a load includes determining whether a load falls by a vehicle, storing one or more surrounding images in response to the falling of the load, transmitting the one or more surrounding images to a center by the vehicle, determining whether the load falls based on the one or more surrounding images by the center, transmitting vehicle control information based on determination of whether the load falls by the center, and controlling the vehicle based on the vehicle control information received from the center.

In some embodiments, the determining whether the load falls by the vehicle may include detecting an object within a preset distance from the vehicle, determining whether a difference between a speed of the vehicle and an initial speed of the object is within a preset speed, determining whether a speed of the object is in a decelerating or stationary state when the speed of the object is within the preset speed, and determining whether the object has moved downwards from above.

In some embodiments, the determining whether the load falls by the vehicle may include determining whether a weight variation of the vehicle is equal to or greater than a preset value.

In some embodiments, the method may further include, when the vehicle weight variation is equal to or greater than the preset value, controlling the vehicle to stop at an adjacent shoulder, and receiving the vehicle control information from the center.

In some embodiments, the method may further include, when the vehicle weight variation is equal to or less than the preset value, controlling the vehicle to move from a current driving lane to a slow lane and to drive at a low speed, and receiving the vehicle control information from the center.

In some embodiments, the method may further include determining whether the load needs to be reloaded, and controlling the vehicle to stop on an adjacent shoulder when the load needs to be reloaded.

In some embodiments, the method may further include checking whether the load falls based on the image information and vehicle information by the center, determining whether the load needs to be reloaded when the center determines that the load falls, determining whether a destination needs to be changed in response to a result of the determining whether the load needs to be reloaded, by the center, and transmitting the vehicle control command to the vehicle in response to a result of the determining whether the destination needs to be changed, by the center.

In some embodiments, the method may further include determining a position at which the load falls by the center, and determining a type of the load that falls.

In some embodiments, the method may further include reporting information on the falling of the load to road government facilities by the center

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EMBODIMENTS

Reference will now be made in detail to apparatuses and various methods according to embodiments of the present invention, examples of which are illustrated in the accompanying drawings. The suffixes "module" and "unit" of elements herein are used for convenience of description and thus can be used interchangeably and do not have any distinguishable meanings or functions.

In the description of embodiments, it will be understood that, when an element is referred to as being "on" or "under" or "before" or "after" another element, the element can be directly adjacent to the other element, or intervening elements may also be present.

It will be understood that, although the terms "first", "second", "A", "B", "(a)", "(b)", etc. may be used herein to describe various elements, these terms are only used to distinguish one element from another element, and the essential order or sequence of the corresponding elements is not limited by these terms. It will be understood that when one element is referred to as being "connected to", "coupled to", or "accessing" another element, the one element may be "connected to", "coupled to", or "access" another element via a further element, or the one element may be directly connected to or directly access the other element.

The terms "comprises", "includes", and "has" when used herein should be interpreted not to exclude other elements but to further include such other elements since the corresponding elements may be included unless mentioned otherwise. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings in the related art from the context. Unless differently defined in the present disclosure, such terms should not be interpreted in an ideal or excessively formal manner.

In a typical autonomous vehicle, a driver or passenger is not capable of checking a problem with his or her vehicle as traffic violation information reported to traffic authorities is obtained by photographing the front of an ego vehicle. Thus, the typical autonomous vehicle is not capable of checking whether a load falls during autonomous driving.

Accordingly, one aspect of the invention provides technology for recognizing falling of a load, preventing a secondary accident, and appropriately controlling a vehicle when a load falls from an autonomous vehicle.

Embodiments of the present invention may provide a vehicle control method based on detection of falling of a load, the method detecting falling of a load to control a vehicle, transmitting a recorded image, vehicle information, and vehicle position information, which correspond to the falling of the load, to a center to re-determine whether a load falls, and determining whether the load needs to be reloaded and whether the vehicle needs to drive to a destination to control vehicle driving. In one embodiment, the center may be a transportation control center located in a fixed location and include a server that can communicate with the vehicle, receive information or data from the vehicle, process the received information or data, generate vehicle operation or driving instructions, and send the instructions to the vehicle.

Figure 1:
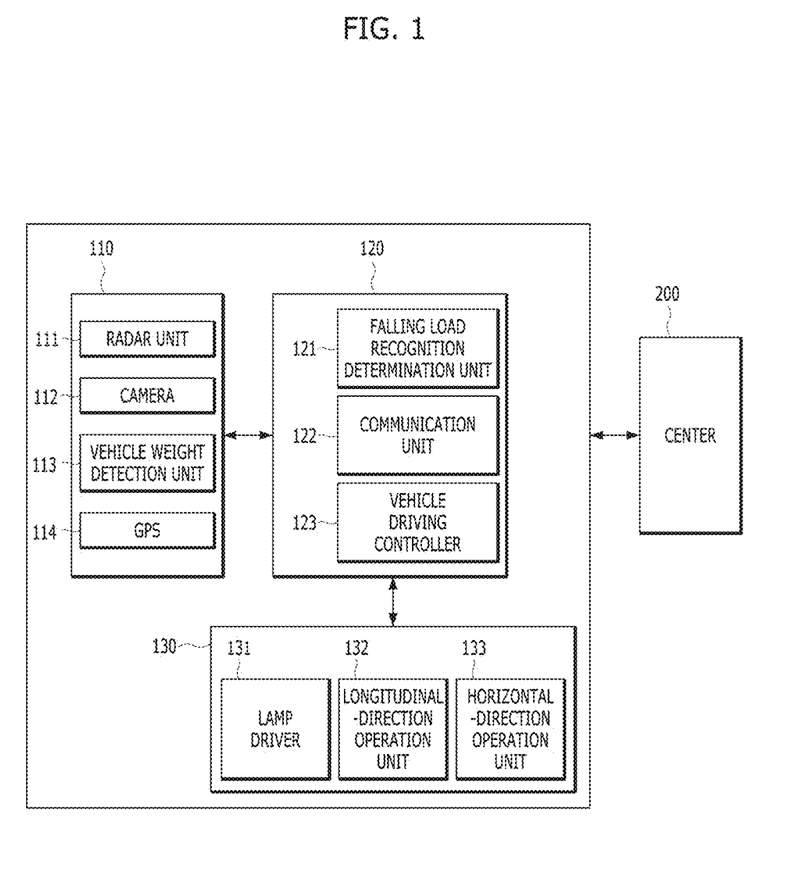
FIG. 1 is a diagram illustrating a vehicle control system based on detection of falling of a load according to an embodiment of the present invention.

FIG. 1 is a diagram illustrating a vehicle control system based on detection of falling of a load according to an embodiment of the present invention.

Referring to FIG. 1, the vehicle control system based on detection of falling of a load may include a vehicle 100 and a center 200.

The vehicle 100 may include a sensor unit 110, a controller 120 and a driver 130.

The sensor unit 110 may include radio detection and ranging (RADAR) unit 111, a camera 112, a vehicle weight detection unit 113, and a global positioning system (GPS) 114.

The RADAR unit 111 may detect information on an object posited around the vehicle 100.

The camera 112 may be installed in the vehicle 100 and may acquire one or more surrounding images (a front image, a rear image, a lateral image, and so on) of the vehicle 100. The one or more surrounding images may include videos. The camera 112 may include a single camera, a 3D camera, an omnidirectional camera, a monocular camera, or the like. The camera 112 may record a rear image of the vehicle 100 when a load 300 falls and the load 300 is recognized behind the vehicle 100.

The vehicle weight detection unit 113 may detect a change in the vehicle weight through a sensor included in the vehicle 100. Then, the vehicle weight detection unit 113 may transmit the vehicle weight change information to a falling load recognition determination unit 121. In one implementation, the vehicle includes one or more sensors and the controller for detecting a weight of the vehicle. The controller determine weight changes of the vehicle based on information indicative of weight of the vehicle received from the one or more sensors.

The GPS 114 may include a GPS receiver for receiving a navigation message broadcast from a satellite and may receive the current position, latitude, and longitude, or the like of the vehicle 100 using the navigation message (GPS information, GPS signals, and satellite signals).

The controller 120 may include the falling load recognition determination unit 121, a vehicle driving controller 123, and a communication unit 122.

The falling load recognition determination unit 121 may determine whether an object is present within a preset distance around the vehicle 100 based on the object information received from the RADAR unit 111.

Upon detecting an object within a preset distance, the falling load recognition determination unit 121 may determine the speed of the detected object. For example, the falling load recognition determination unit 121 may determine whether the speed of the vehicle 100 and the initial speed of the detected object are within 0 to 5 km/h.

Then, the falling load recognition determination unit 121 may determine whether the detected object decelerates. The falling load recognition determination unit 121 may determine whether the speed of the detected object is in a stationary state. The falling load recognition determination unit 121 may determine whether the position of the detected object is moved downwards from above. The falling load recognition determination unit 121 may recognize falling of the load 300 based on a change in the vehicle weight.

Upon recognizing falling of the load 300 as the RADAR unit 111 recognizes an object, the falling load recognition determination unit 121 may perform control so that the camera 112 records an image.

The communication unit 122 may transmit vehicle information, image information, vehicle weight information, and vehicle position information of the vehicle 100 to the center 200. The communication unit 122 may receive a vehicle control command from the center 200.

When the falling load recognition determination unit 121 recognizes falling of the load 300 based on a vehicle weight change, the vehicle driving controller 123 may control the driving path of the vehicle 100.

For example, when the vehicle weight variation received from the falling load recognition determination unit 121 is equal to or greater than 200 kg, the vehicle driving controller 123 may control the vehicle 100 to stop on an adjacent shoulder.

For example, when the vehicle weight variation received from the falling load recognition determination unit 121 is equal to or less than 200 kg, the vehicle driving controller 123 may control the vehicle 100 to move to a low-speed lane and to drive at a low speed.

The vehicle driving controller 123 may receive the vehicle control command from the center 200 and may drive the vehicle to a destination.

For example, the vehicle driving controller 123 may control the vehicle to drive to the original address prior to falling of the load 300 as the destination based on the vehicle control command received from the center 200.

For example, the vehicle driving controller 123 may control the vehicle to drive to a changed address after falling of the load 300 as the destination based on the vehicle control command received from the center 200.

The driver 130 may include a lamp driver 131 for driving a vehicular external lamp, a longitudinal-direction operation unit 132 for driving the vehicle to accelerate and decelerate, and a horizontal-direction operation unit 133 for driving vehicle steering.

The center 200 may receive a recorded image, vehicle information, and vehicle position information from the communication unit 122. The vehicle information may include vehicle weight change information.

The center 200 may determine whether the load 300 actually falls based on the recorded image and the vehicle information.

Upon determining that the load 300 actually falls, the center 200 may determine the falling position of the load based on position information of the vehicle 100. Therewith, the center 200 may determine the type of the load. The center 200 may determine whether the load needs to be reloaded.

The center 200 may determine whether the vehicle needs to drive to a destination in response to falling of the load 300. For example, the center 200 may determine whether the vehicle 100 from which the load 300 falls will drive to an existing destination or will drive to a changed destination.

Figure 2:
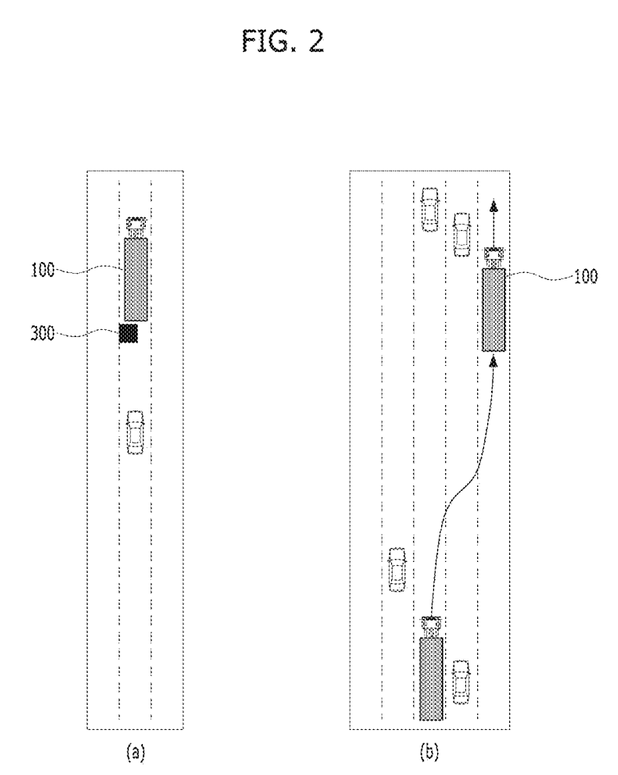
FIG. 2 is a diagram showing the concept of a method of controlling a vehicle based on detection of falling of a load according to an embodiment of the present invention.

FIG. 2 is a diagram showing the concept of a method of controlling the vehicle 100 based on detection of falling of a load according to an embodiment of the present invention.

Referring to FIGS. 2A to 2B, when the load 300 falls, the vehicle 100 may recognize falling of the load 300 through the RADAR unit 111.

Accordingly, the vehicle 100 may detect an object within a preset distance. Then, the vehicle 100 may determine whether the difference between the current driving speed and the initial speed of the detected object is within a preset speed. When the speed of the detected object is within the preset speed, whether the speed of the object is in a decelerating or stationary state may be determined. Then, whether the position of the detected object has moved downwards from above may be determined. Accordingly, the vehicle 100 may determine that the load 300 falls.

Then, the vehicle 100 may measure a weight variation and may determine whether the weight variation is equal to or greater than 200 kg. When the vehicle weight variation is equal to or greater than 200 kg, the vehicle 100 may stop on an adjacent shoulder.

The vehicle 100 may measure a weight variation and may drive at a low speed when the weight change is equal to or less than 200 kg. In this case, the vehicle 100 may move from a current driving lane to a slow lane for low-speed driving.

For example, when the vehicle 100 recognizes falling of the load 300 while driving in a third lane of a road with five lanes, the vehicle 100 may move to a fifth lane as a driving lane for low-speed driving.

Figure 3:
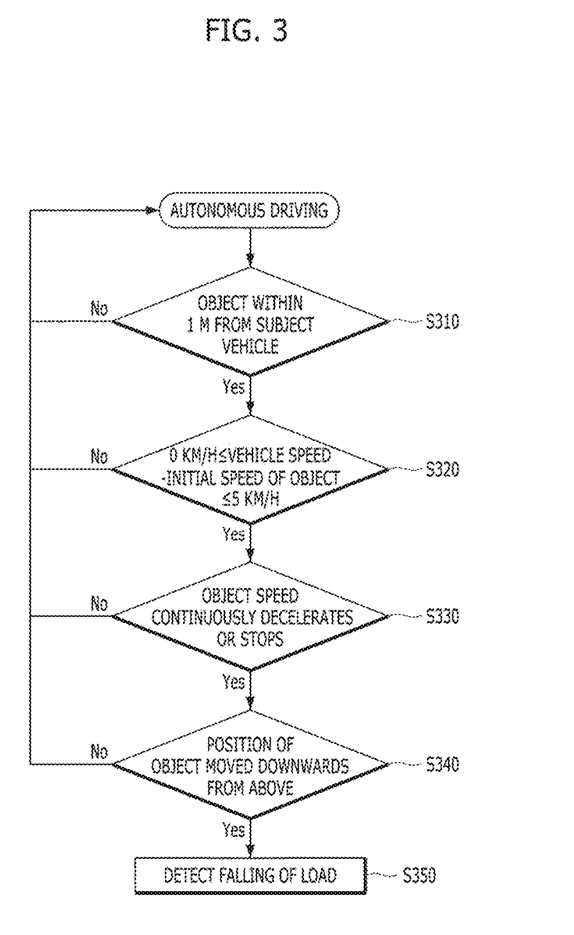
FIG. 3 is a flowchart showing a method of detecting falling of a load according to an embodiment of the present invention.

FIG. 3 is a flowchart showing a method of detecting falling of a load according to an embodiment of the present invention.

Referring to FIG. 3, when the vehicle 100 drives autonomously, the vehicle 100 may determine whether an object is present within 1 m thereof (S310).

After operation S310, the falling load recognition determination unit 121 of the vehicle 100 may determine whether the difference between the speed of the vehicle 100 and the initial speed of the object is between 0 and 5 km/h (S320).

After operation S320, the vehicle 100 may determine whether the speed of the object is in a continuous decelerating or stationary state (S330).

After operation S330, the vehicle 100 may determine whether a vertical position of the object is moved downwards from above (S340).

When operation S340 is satisfied, the vehicle 100 may detect falling of the load 300 (S350).

Figure 4:
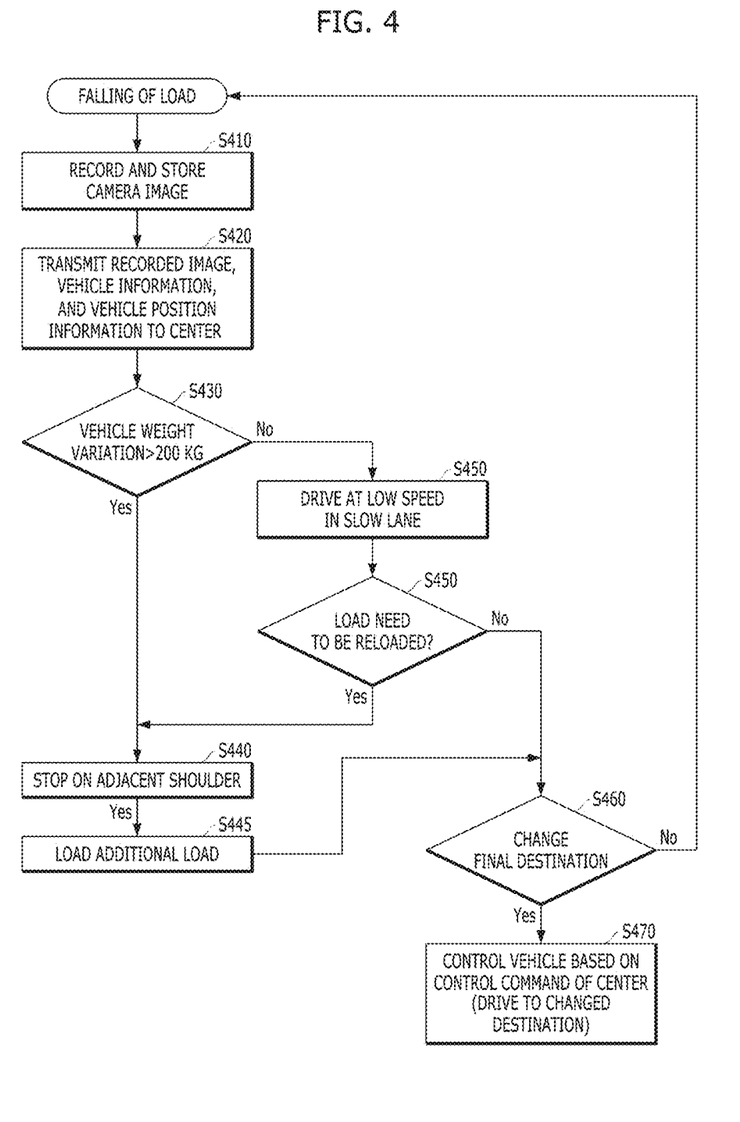
FIG. 4 is a flowchart of a method of controlling a vehicle based on falling of a load according to an embodiment of the present invention.

FIG. 4 is a flowchart of a method of controlling a vehicle based on falling of a load according to an embodiment of the present invention.

Referring to FIG. 4, when the load 300 falls, the vehicle 100 may record an image of a rear camera and may store the recorded image. Then, the vehicle 100 may transmit the recorded image, vehicle information, and vehicle position information to the center 200 (S410 and S420).

After operation S420, the vehicle 100 may determine whether the vehicle weight variation is equal to or greater than 200 kg (S430).

When operation S430 is satisfied, the vehicle 100 may stop on an adjacent shoulder. Then, the load 300 that falls may be reloaded on the vehicle 100 (S440 and S445).

After operation S445, the vehicle 100 may determine whether a final destination is changed. When the vehicle 100 changes the final destination, the vehicle 100 may drive in response to a control command received from the center 200 (S460 and S470).

After operation S430, when the vehicle weight variation is equal to or less than a preset value, the vehicle 100 may move to a slow lane and may drive at a low speed. Then, the vehicle 100 may determine whether the load 300 needs to be reloaded (S450 and S455).

After operation S455, if the vehicle 100 determines that the load 300 needs to be reloaded, operation S440 may be performed. After operation S455, if the vehicle 100 determines that the load 300 does not need to be reloaded, operation S460 may be performed.

Figure 5:
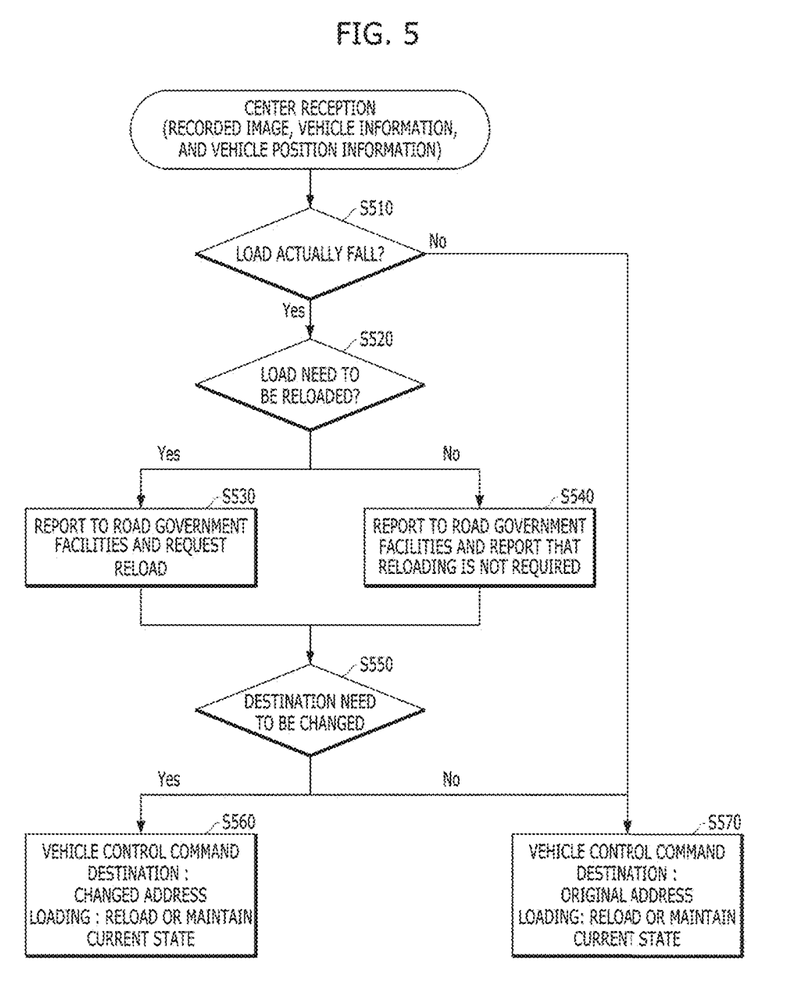
FIG. 5 is a flowchart showing a method of controlling determination of a center according to an embodiment of the present invention.

FIG. 5 is a flowchart showing a method of controlling the determination of a center according to an embodiment of the present invention.

Referring to FIG. 5, the center 200 may receive a recorded image, vehicle information, and position information of the load 300 from the vehicle 100. Then, the center 200 may determine whether the load 300 actually falls (S510). After operation S510, the center 200 may determine whether the load 300 needs to be reloaded (S520).

When operation S520 is satisfied, the center 200 may report the following of the load to road government facilities and may send a reloading request thereto (S530). When operation S520 is not satisfied, the center 200 may report the fallwing of the load to the road government facilities and may report thereto that reloading is not necessary (S540).

After operations S530 and S540, the center 200 may determine whether a destination needs to be changed (S550).

When operation S550 is satisfied, the center 200 may generate a vehicle control command in response to a destination change. When the destination change is needed, the vehicle control command may include a changed address as the destination information. In this case, the loading information may include information on a state in which reloading is needed or a state in which the current state is to be maintained (S560).

When operation S550 is not satisfied, the center 200 may generate the vehicle control command in response to the destination change. When the destination change is not needed, the vehicle control command may include an original address as the destination information. In this case, the loading information may include information on a state in which reloading is needed or a state in which the current state is to be maintained (S570).

When operation S510 is not satisfied, operation S570 may be performed.

In embodiments, a vehicle includes one or more sensors and a controller. A load is loaded on the vehicle. The controller determines whether the load falls based on information received from the one or more sensors. The information from the one or more sensors may include one or more images of surrounding of the vehicle from camera, information indicative of weight of the vehicle, information from LiDAR sensors, and information from RADAR sensors. When the controller determined the load's falling, the controller stores one or more surrounding images in a storage and sends the one or more surrounding images to a server in a transportation control center for further determination on the load's falling.

The server further determines whether the load has fallen based on the one or more images from the vehicle. When the server determines that the load has fallen, the server generates vehicle control information. The vehicle control information may include vehicle driving instructions which include vehicle's changed destination. The server sends the vehicle control information to the vehicle such that the vehicle operates based on the vehicle control information.

When the vehicle's controller determines that the load falls, in addition to sending the images to the server, the controller may control the vehicle's operation as discussed above. For example, the controller may cause the vehicle to move to a road shoulder and stop.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

A vehicle control method and system based on detection of falling of a load according to embodiments of the present invention may have the following advantages.

Since falling of a load is automatically detected, the information is transmitted to a center, and whether the load falls is re-determined, it may be possible to determine whether the load needs to be reloaded and whether a corresponding vehicle needs to continuously drive to a destination, and accordingly, unnecessary driving may be advantageously reduced.

Since the falling of the load is reported to road government facilities, a secondary accident due to the falling of the load may be prevented and rapid road maintenance may be possible, which are advantageous.

It will be appreciated by persons skilled in the art that that the effects that could be achieved with the present invention are not limited to what has been particularly described hereinabove and other advantages of the present invention will be more clearly understood from the detailed description.

The aforementioned method according to an embodiment may also be embodied as computer readable code on a computer readable recording medium. Examples of the computer readable recording medium include read-only memory (ROM), random-access memory (RAM), CD-ROMs, magnetic tapes, floppy disks, optical data storage devices, etc. The computer readable recording medium may also be distributed over network coupled computer systems so that the computer readable code is stored and executed in a distributed fashion. Also, functional programs, code, and code segments for accomplishing the aforementioned method may be easily construed by programmers skilled in the art to which the present invention pertains.

What is claimed is:

1. A method of controlling a vehicle, the method comprising:
    determining, by the vehicle, whether a load falls;
    storing one or more surrounding images in response to determining that the load falls from the vehicle;
    transmitting the one or more surrounding images to a server by the vehicle for further determining, by the server, whether the load falls based on the one or more surrounding images;
    receiving vehicle control information generated by the server when determined that the load falls; and
    controlling the vehicle based on the vehicle control information received from the server;
    wherein determining whether the load falls by the vehicle comprises:
    identifying an object within a preset distance from the vehicle;
    determining whether a difference between a speed of the vehicle and an initial speed of the object is within a preset speed;
    determining whether a speed of the object is in a decelerating or stationary state when the speed of the object is within the preset speed; and
    determining whether the object has moved downwards from above.

2. The method of claim 1, wherein the determining whether the load falls from the vehicle comprises determining whether a weight variation of the vehicle is equal to or greater than a preset value.

3. The method of claim 1, further comprising:
    checking whether the load falls, the checking being based on the one or more surrounding images and vehicle information and being performed by the server;
    determining, by the server, whether the load needs to be reloaded when the server determines that the load falls;
    determining, by the server, whether a destination needs to be changed in response to a result of the determining whether the load needs to be reloaded; and transmitting, by the server, the vehicle control information to the vehicle in response to a result of the determining whether the destination needs to be changed.

4. The method of claim 2, further comprising controlling the vehicle to stop at an adjacent shoulder when the weight variation of the vehicle is equal to or greater than the preset value.

5. The method of claim 2, further comprising controlling the vehicle to move from a current driving lane to a slow lane and to drive at a low speed when the weight variation of the vehicle is equal to or less than the preset value.

6. The method of claim 5, further comprising:
determining whether the load needs to be reloaded; and
controlling the vehicle to stop on an adjacent shoulder when the load needs to be reloaded.

7. A method of controlling a vehicle, the method comprising:
determining, by the vehicle, whether a load falls from the vehicle by determining whether a weight variation of the vehicle is equal to or greater than a preset value;
storing one or more surrounding images in response to determining that the load falls from the vehicle;
transmitting the one or more surrounding images to a server by the vehicle for further determining, by the server, whether the load falls from the vehicle based on the one or more surrounding images;
receiving vehicle control information generated by the server when determined that the load falls from the vehicle;
controlling the vehicle based on the vehicle control information received from the server; and
controlling the vehicle to move from a current driving lane to a slow lane and to drive at a low speed when the weight variation of the vehicle is equal to or less than the preset value.

8. The method of claim 3, further comprising:
determining, by the server, a position at which the load falls; and
determining, by the server, a type of the load that falls.

9. The method of claim 3, further comprising reporting, by the server, information on the falling of the load to road government facilities.

10. A non-transitory computer readable recording medium having recorded thereon a program for executing the method of claim 1.

11. A vehicle control system based on determination of falling of a load, the system comprising:
a vehicle; and
a server;
wherein the vehicle is configured to determine whether a load falls from the vehicle, to store one or more surrounding images in response to the falling of the load from the vehicle, and to transmit the one or more surrounding images to the server;
wherein the server is configured to determine whether the load falls based on the one or more surrounding images and to transmit vehicle control information based on determination of whether the load falls, wherein the vehicle is configured to operate based on the vehicle control information received from the server, and
wherein the vehicle is configured to identify an object within a preset distance, determine whether a difference between a speed of the vehicle and an initial speed of the object is within a preset speed, determine whether a speed of the object is in a decelerating or stationary state when the speed of the object is within the preset speed, and determine whether the object has moved downwards from above.

12. The system of claim 11, wherein the vehicle is configured to determine whether a weight variation of the vehicle is equal to or greater than a preset value.

13. The system of claim 12, wherein the vehicle is configured to operate to stop at an adjacent shoulder and receive the vehicle control information from the server when the weight variation of the vehicle is equal to or greater than the preset value.

14. The system of claim 12, wherein the vehicle is configured to operate to move from a current driving lane to a slow lane, drive at a low speed, and receive the vehicle control information from the server when the weight variation of the vehicle is equal to or less than the preset value.

15. The system of claim 14, wherein the vehicle is configured to determine whether the load needs to be reloaded and stop on an adjacent shoulder when the load needs to be reloaded.

16. The system of claim 11, wherein the server is configured to further determine whether the load falls from the vehicle based on the one or more surrounding images and vehicle information, determine whether the load needs to be reloaded upon determining that the load falls, determine whether a destination needs to be changed in response to a result of the determining whether the load needs to be reloaded, and transmit the vehicle control information to the vehicle in response to a result of the determining whether the destination needs to be changed.

17. The system of claim 16, wherein the server is configured to determine a position at which the load falls and determine a type of the load that falls.

18. The system of claim 16, wherein the server is configured to report information on the falling of the load to road government facilities.

19. The method of claim 1, wherein determining whether the load falls comprises determining whether the load falls from the vehicle.

20. The method of claim 7, further comprising controlling the vehicle to move from a current driving lane to a slow lane and to drive at a low speed when the weight variation of the vehicle is equal to or less than the preset value.

* * * * *